March 15, 1938. S. MARCUS 2,111,150
MANNIKIN WITH EYES AND LASHES
Filed May 11, 1934   3 Sheets-Sheet 1
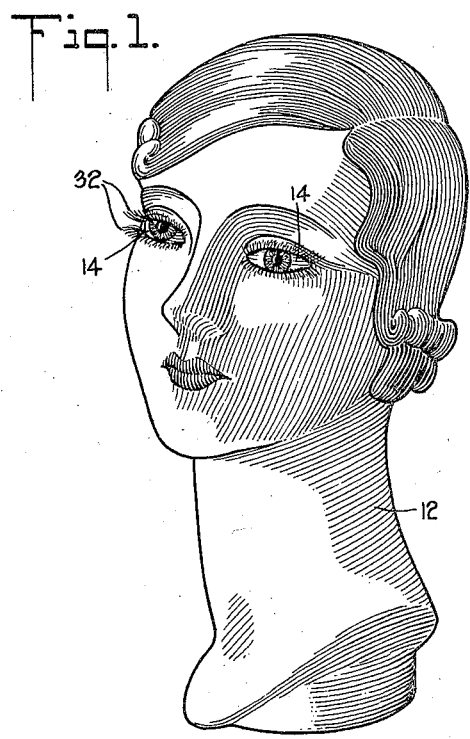
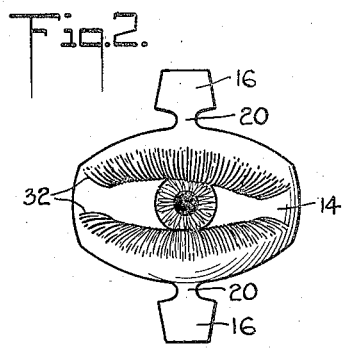
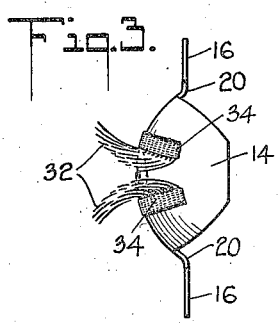
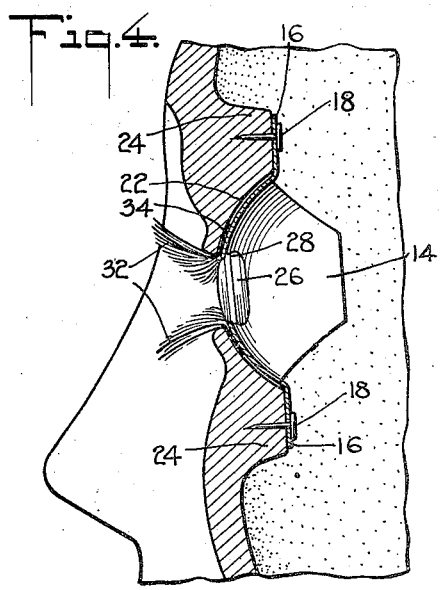
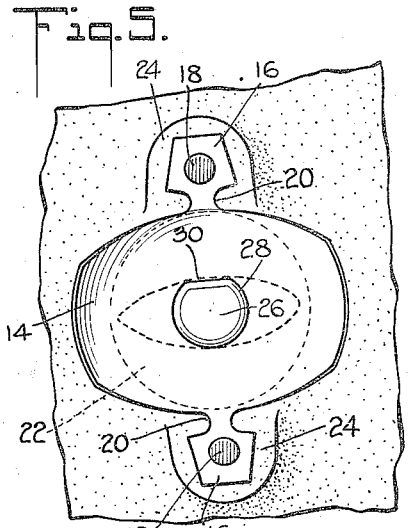
INVENTOR
Samuel Marcus
BY
ATTORNEYS

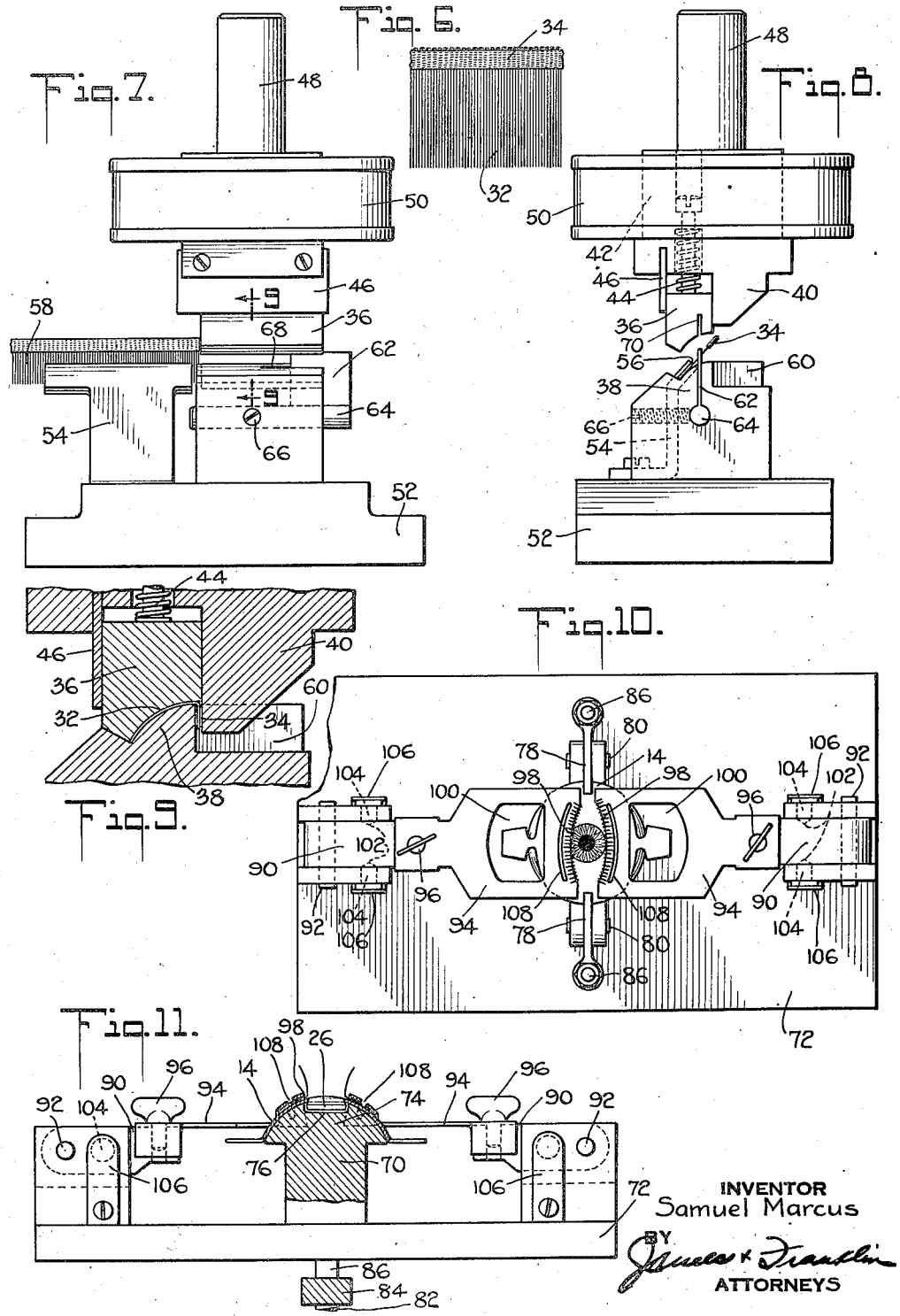

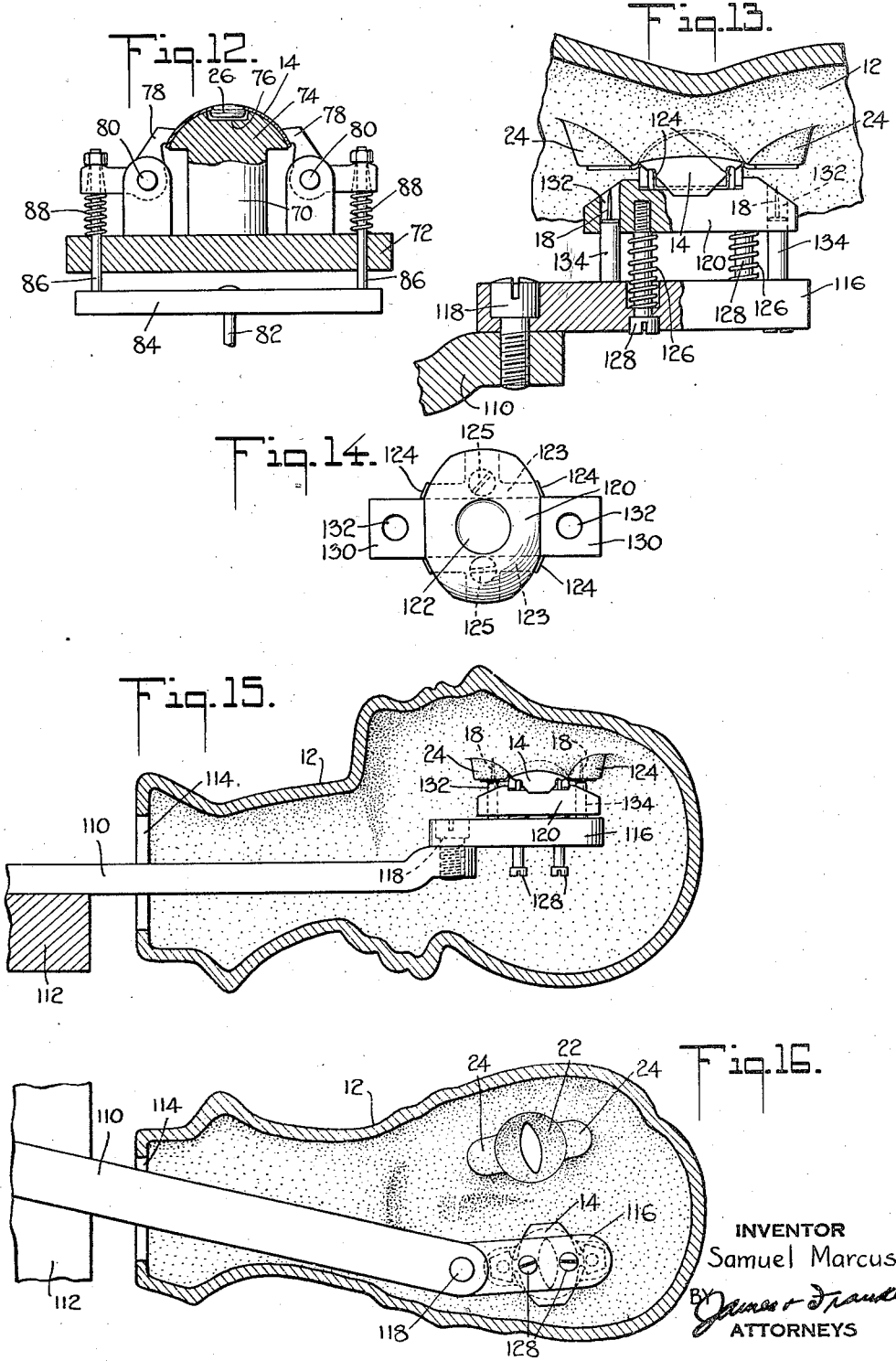

Patented Mar. 15, 1938

2,111,150

UNITED STATES PATENT OFFICE 2,111,150

MANNIKIN WITH EYES AND LASHES

Samuel Marcus, Belle Harbor, N. Y., assignor, by mesne assignments, to Margon Corporation, Bayonne, N. J., a corporation of New Jersey Application May 11, 1934, Serial No. 725,183

12 Claims. (Cl. 132—32)

This invention relates to mannikins, and more particularly to mannikins provided with eyes and lashes.

Mannikins are widely employed in store windows, millinery shops, and the like. The eyes are usually merely painted on the head, and if lashes are provided they are ordinarily clumsily visibly cemented on the outside of the head. The object of my invention is to generally improve mannikin heads by providing the same with eyes of realistic and natural appearance which will add to rather than detract from the beauty of the head.

In one aspect, my invention resides in the provision of an improved eye member especially adapted for mounting in a mannikin head and preferably provided with long, flexible, luxuriant eye lashes so disposed as to closely hug the eye opening, and so formed and pressed as to naturally curve outwardly from the eye openings in a realistic and attractive manner. This improved eye member is disclosed and claimed in my divisional application Serial No. 61,903, filed February 1, 1936.

Further objects of my invention center about an improved technique for making the eye members; for making and curling the special eye lashes therefor; for applying the lashes to the eyes in such manner as to accurately fit any desired pattern of eye opening; and for mounting the eyes and lashes in the head. A further object of my invention is to provide appropriate apparatus for use with the said method or technique.

To the accomplishment of the foregoing and other objects which will hereinafter appear, my invention consists in the mannikin, eye and method and apparatus for making and using the same, as are hereinafter more particularly described in the specification and sought to be defined in the claims. The specification is accompanied by drawings, in which:

Fig. 1 shows a mannikin head provided with eyes and lashes in accordance with my invention;

Fig. 2 is a front elevation of an eye member embodying features of my invention;

Fig. 3 is a side elevation of the same;

Fig. 4 shows the eye member mounted in the head;

Fig. 5 is a rear elevation of the same;

Fig. 6 is an enlarged detail of a part of a lash;

Fig. 7 is a front elevation of apparatus for curling, folding, and severing the lashes;

Fig. 8 is a side elevation of the same;

Fig. 9 is an enlarged section through the curling and folding irons, taken in the plane of the line 9—9 of Fig. 7;

Fig. 10 is a plan view of apparatus for cementing the lashes to the eye members;

Fig. 11 is a partially sectioned front elevation of the same;

Fig. 12 is a partially sectioned side elevation of the same;

Fig. 13 is an enlarged section through part of the apparatus for mounting the eye member in a head;

Fig. 14 is a plan view of the table in said apparatus;

Fig. 15 is a side elevation of the mounting tool in use; and

Fig. 16 is an inverted plan view of the same.

Referring to the drawings, the mannikin head 12 differs from those usually employed, in being molded from a wood flour mixture instead of papier mâché or plaster of Paris, neither of which substances is comparable with the wood flour construction in durability. The head may be painted in the usual way, but is not provided with painted eyes. Instead, eye openings are punched through the head by appropriate punches having a cross-section like that of the desired eye opening. It should be understood that one eye opening may be and preferably is somewhat different in area and shape from the other, depending upon the effect and expression that the artist seeks to convey. One eye may be less widely open than the other, and may have a slightly different angle or droop. Inasmuch as only a limited quantity of each type of head is produced, it is important that the technique or procedure followed in providing the head with eyes be especially adapted to accommodate the variations desired by the artist for different heads. The manner in which this is accomplished will appear later in this specification.

The head 12 is provided with internally mounted eyes and lashes. A preferred form of eye member is shown in Figs. 2 and 3 and comprises thin flexible sheet material 14, preferably white celluloid, pressed to give the same a convexly curved surface. This surface may desirably be a part of a sphere of predetermined radius. The area of the eye member is small relative to a complete sphere, for this economizes in material and affords some yieldability of the surface for self-adjustment in contact with the interior of the head. The eye member is preferably provided with outwardly projecting arms 16 which are most simply formed integrally with the eye member, and which may be nailed to the head by appropriate tacks or nails 18, best shown in Figs. 4 and 5. In the present case the arms 16 project upwardly and downwardly from the eye member and are necked or narrowed at 20 to increase the bendability of the arms relative to the eye member.

After eye openings have been punched through the head, these openings are preferably internally frazed by a spherically surfaced frazing tool having a radius of curvature equal to that of the eye member. This frazing is best indicated at 22 in Fig. 16. The head when molded is preferably provided on its inner wall adjacent the eye openings, with raised seats 24. The arms 16 are nailed to and bear against the seats 24, and the bendable relation between the arms and the eye member insures an accurate close fit of the eye member against the eye opening as the arms are drawn against the seats.

The eye member 14 is preferably provided with a lens 26 inserted therein and provided with appropriate iris and pupil simulating portions. The lens 26 may be inserted from behind the eye member so that its front surface is substantially flush with that of the eye member, the remainder of the lens being outwardly flanged, as is indicated at 28, to limit the outward movement of the lens. Because of the thickness of the lens it is possible to give an appearance of realistic depth to the eye. If desired, a part of the lens may be cut away at the top or/and bottom edges where such portions are anyway concealed by the eye lid or head, and in the present case I illustrate a lens which is cut away at the top edge 30, as is best shown in Fig. 5. It will be understood, however, that a full circular lens may be used.

The eye member is further provided with eye lashes 32, and in the present case with both upper and lower lashes. These lashes are preferably long, fine, and luxuriant. They may be attached to the eye member in various ways, but I find it most simple to cement the same directly to the exterior of the eye member, and some of the advantages of this procedure will appear later. The lash strands are bound in a woven foundation 34 which is turned or folded outwardly and cemented to the eye member. The longitudinal strands of the foundation may be made of such fine silk as not to appreciably increase the thickness of the foundation, which may be quite narrow, say one-sixteenth of an inch or less for lash strands having a length of one-half an inch or more. It will be noted that the lash strands are turned outwardly from the eye member in a sharp fold or crease, and that they define an area corresponding in shape and size with the eye opening, so that the lashes closely hug the eye opening and therefore appear to project from the edges of the lids, as they should.

The manner in which this desirable result is obtained will be described with reference to Figs. 7 through 12, showing apparatus for curling and securing the lashes to the eye member. The lash is woven as a continuous ribbon, a small section of which is shown in Fig. 6. The strands 32 and foundation 34 lie flat or in one plane. This ribbon is fed to curling and folding irons 36, 38, and 40 (Fig. 9) which fold and curl the lash to desired shape. Specifically, the lash strands 32 are curled between curling irons 36 and 38, while the foundation 34 is bent or folded at a sharp angle to the strands 32 by the irons 38 and 40. These irons are heated and operated under substantial pressure to press the lash permanently to desired shape. The iron 36 is mounted on a head or platen 42 through a compression spring 44 in order to limit the pressure applied to the lash, and, more importantly, in order to clamp the lash strands in position prior to the operation of the folding iron 40. Curling iron 36 may be supported and guided by a plate 46 secured to the head 42. Folding iron 40 is permanently attached to and may be formed integrally with the head 42. An upstanding boss 48 on head 42 is adapted to be mounted in a standard press. Suitable heating means 50 is provided to keep the irons 36 and 40 at high temperature. The lower or stationary iron 38 is mounted on a base plate 52 which in turn is mounted on the lower or stationary bed of the press.

I prefer to combine with the apparatus thus far described, appropriate means for guiding the lash ribbon in place and for severing individual lengths of lash therefrom. Specifically, the base 52 carries a guide or rest 54 having its upper edge slotted at 56 to receive the continuous lash ribbon 58. The slot 56 is in alignment with the surface of curling iron 38 and serves to guide the ribbon accurately thereto.

The lower iron 38 is provided at its leading edge with a knife blade 60 which cooperates with the adjacent edge of the upper iron 40. It will be understood, therefore, that as the press head descends, the lash is not only clamped and shaped, but the foundation 34 is severed, thus separating an individual eye lash from the continuous lash ribbon.

To predetermine the desired length of the eye lash, I employ a stop or gauge plate 62 secured to a rod 64 reciprocable through the lower iron. The position of the gauge plate may be locked at any desired adjustment by a set screw 66. It will be noted that the lower curling iron 38 is slotted at 68 (Fig. 7), while the upper curling iron 36 is slotted at 70 (Fig. 8) to receive the gauge plate or stop 62. In operation, the lash ribbon is moved as far as the gauge plate, and the press operated to sever, curl, and fold a complete lash. These lashes are changed from the flat condition of Fig. 6 to a section corresponding to that shown in Fig. 9 and convenient for application to the eye member, as is next described.

To secure the lashes to the eye member in proper location, I employ the apparatus shown in Figs. 10, 11, and 12. This apparatus comprises a stationary table 70 mounted on a base 72. The table 70 is somewhat mushroom-like in shape and has an enlarged curved head 74 adapted to fit within and to receive the eye member 14. The head 74 is recessed at 76 to provide clearance for the lens 26 of the eye member. The eye member is held in position by gripper fingers 78 pivoted at 80 and releasable by a treadle, not shown, connected to the apparatus by a rod 82, a cross bar 84, and links 86. The fingers 78 are normally urged against the eye member by compression springs 88, best shown in Fig. 12. By stepping on the treadle, the fingers 78 are moved outwardly, permitting an eye member to be placed on the table and there held in position by release of the treadle.

Base 72 further supports arms 90 pivoted at 92 and each carrying eye lash clamps 94. Clamps 94 are made of thin resilient sheet metal, for example, phosphor bronze, and are secured to the arms 90 by thumb screws 96. The ends 98 of clamps 94 are cut to a pattern conforming with the eye opening for either the left or the right eye of the particular head being made. In practice, I place an eye, preferably a blind eye (that is, one having no lens) in a head of the type being made, and trace the outline of the eye opening on the celluloid. The blind eye is then placed on table 70, and the clamps 94 are cut until they mate accurately with the pencil line indications on the blind eye. The clamps 94 are largely cut away, as at 100, to increase the flexibility of the edge portions 98, so that the clamps will bend to conform to the spherical surface of the eye member, as is shown in Fig. 11.

The clamps are normally held downwardly firmly against the eye member by resilient means. In the present case the arms 90 are recessed at 102 with conical recesses mating with the conical ends of reciprocable pins 104. These pins are normally urged inwardly by leaf springs 106. The clamps are readily pulled upwardly and swung away from the eye member, but when pressed downwardly the pins 104 engage the conical recesses and thus hold the clamps in closed position.

The clamps 94 are preferably slotted at 108, just back of the curved edges 98.

In operation, a lash is placed on the eye member and one clamp lowered thereon, the lash being moved against the edge of the clamp to locate the same accurately in position. The clamp then holds the lash firmly in place while the other lash is properly located with the aid of the other clamp member. The lashes are then cemented in place, preferably by the application of a solvent for the celluloid, through the slots 108. This is readily and quickly accomplished by a light brush stroke. The cement or solvent is prevented from reaching the edges of the eye opening, and is instead confined to the lash foundation. After slight delay, the clamps 94 may be raised and the treadle operated to release the completed eye member. Where the left and right eye openings differ in shape, as is usually the case with these mannikin heads, a different set of clamps is provided patterned to fit the other eye opening. The eyes are grouped as "Lefts" and "Rights" and may be marked accordingly.

The eyes are next mounted in the mannikin head. These heads usually have a relatively long slender neck and a very small neck opening. The apparatus or tool used is therefore slender in construction. Referring to Figs. 13 through 16, the tool consists of an arm 110 rigidly mounted on a work-bench 112 and adapted to pass through the neck opening 114 of the head. The end portion 116 of the arm is pivotally related to the stationary part 110, being in the present case articulated at 118 so as to permit angular adjustment. This adjustment is fixed for the left or right eye of any one type of head. The adjustable part 116 carries a vertically reciprocable table 120 having a central portion shaped to fit within and support the eye member 14. The table 120 is recessed at 122 to clear the lens of the eye member. It is further provided with small resilient fingers 124 adapted to receive and lightly hold the eye member in place. The fingers are formed at the ends of T-shaped strips 123 secured beneath the table at 125. The table is normally urged upwardly by compression springs 126, surrounding guide and motion limiting pins 128, which are reciprocable through arm 116.

The table 120 includes extensions 130 which are recessed to receive mounting means for the eye member. In the present case they are bored at 132 to receive tacks or nails. The arm 116 is provided with stationary posts 134 which fit within the holes 132 and which bear against the heads of the tacks or nails 18, as is best shown in Fig. 13. It will be understood that by pressing the head firmly downwardly, the eye member and table are forced downwardly relative to the posts 134 which meanwhile force the tacks upwardly and impale the same in the seats 24, as is best shown in Fig. 15.

It is important to properly locate the eye member at the eye opening during the mounting operation. It should also be kept in mind that the lashes are long and outwardly curled. I find that if the lashes are made flexible, as is anyway desirable for appearance, they may be passed through the eye opening by first moving the head over the eye (which, of course, is preliminarily placed on the table 120 of the mounting apparatus) in one direction, brushing against the lashes until one of the lashes comes through the eye opening, and then moving the head in the opposite direction, that is, toward the lash which has come through the eye opening, and, in fact, bending the said lash downwardly for some distance until the opposite lash comes through the eye opening. The head may then be moved back part-way until both the upper and lower lashes mate accurately with the upper and lower edges of the eye opening, whereupon the head may be forced downwardly to secure the eye in place. It should be understood that with my method of preliminarily folding and curling the lashes, they are not only improved in appearance, but actually serve to accurately define the desired location of the eye member during the mounting operation. After the nails have been impaled in the head, the head is raised and slid from the mounting tool, the eye being readily released by the spring fingers 124.

It is believed that my new technique for the provision of eyes and lashes in mannikins, as well as the many advantages thereof, will be apparent from the foregoing detailed description. The mannikin head is improved in realism because of the natural appearance and location of the eye, and the long, luxuriant, curled lashes provided therewith. The eyes may be constructed and mounted in place in a relatively inexpensive manner, although patterned to fit any desired shape of eye opening. The relatively thin flexible celluloid construction of the eye, without rigid backing, insures close accurate seating of the eye against the back of the eye opening. The lashes are folded and curled in a manner which makes it convenient to apply the same to the eye members and which insures an attractive appearance of the mannikin because the lashes bear closely against the eye lids and appear to project directly therefrom.

The eyes are preferably supported by arms formed integrally therewith and flexibly related thereto. The arms preferably extend upwardly and downwardly because this provides ample room for the eye supporting seats within the head; permits ready adjustment of the eye member about a vertical axis, so as to best seat itself at the horizontally elongated eye opening; and, finally, because it permits the mounting tool to be kept slender, so that it may be readily passed through the neck opening of the head.

It will be apparent that while I have shown and described my invention in preferred form, many changes and modifications may be made therein, without departing from the spirit of the invention defined in the following claims.

I claim:

1. In the manufacture of a mannikin eye including a simulated eyeball and lash strands, the method which includes preliminarily sharply folding the lash by simultaneously heating and pressing the base or foundation of the lash at an abrupt angle to the strands of the lash, and then cementing the base of the lash flat on the outside surface of the eyeball.

2. In the manufacture of a mannikin eye including a simulated eyeball and lash strands mounted on the exterior thereof, the method which includes preliminarily forming a lash ribbon having a narrow woven foundation at one edge thereof, folding and curling the lash by heating and pressing the lash strands to the desired curved or curled shape and the base or foundation to a folded position at a sharp angle to the strands, and then cementing the base of the lash flat on the outside surface of the eyeball.

3. In the manufacture of a mannikin eye for use within a mannikin head having eyeballs and eye openings of predetermined configuration, the eyeballs being placed behind and exposed through the eye openings, the method of providing each eyeball with a lash, which includes securing the lash directly upon the exterior of the eyeball outside of an area corresponding to the eye opening, said lash being free from and projecting outwardly from the eye at the boundary of the specified area, whereby said lash may project outwardly through the eye opening against the periphery thereof.

4. In the manufacture of a mannikin eye for use within a mannikin head having eyeballs and eye openings of predetermined configuration, the eyeballs being placed behind and exposed through the eye openings, the method of providing each eyeball with lashes, which includes cementing top and bottom lashes directly upon the exterior of the eyeball outside of an area corresponding to the eye opening, said lashes being free from and projecting outwardly from the eye at the boundary of the specified area, whereby said lashes may project outwardly through the eye opening against the periphery thereof.

5. In the manufacture of a mannikin eye including a simulated eyeball and lash strands mounted on the exterior thereof, for use within a mannikin head having eye openings of predetermined configuration, the method which includes preliminarily folding the lash by simultaneously heating and pressing the base or foundation of the lash at a sharp angle to the lash strands, securing said lash foundation directly upon the exterior of the eyeball outside of an area corresponding to the eye opening, said lash strands being free from and projecting outwardly from the eye at the boundary of the specified area.

6. In the manufacture of a mannikin eye including a simulated eyeball and lash strands mounted on the exterior thereof, for use within a mannikin head having eye openings of predetermined configuration, the method which includes preliminarily folding and curling the lash by simultaneously heating and pressing the lash strands to the desired curved or curled shape and the base or foundation to a folded position at a sharp angle to the strands, cementing said lash foundation directly upon the exterior of the eyeball outside of an area corresponding to the eye opening, said lash strands being free from and projecting outwardly from the eye at the boundary of the specified area.

7. Apparatus for forming artificial lashes for a mannikin eye, said apparatus comprising mating upper and lower irons to clamp and curl the lash strands, and an additional iron to fold and press the lash foundation at a sharp angle relative to the lash strands, a press for relatively moving, and means to heat the same.

8. Apparatus for forming lashes for a mannikin eye, said apparatus comprising mating upper and lower curling irons to curl the lash strands, means to heat the same, means to guide a continuous lash ribbon in proper relation to the curling irons, and means operable simultaneously with the curling irons for severing a length of lash from the lash ribbon.

9. Apparatus for forming lashes for a mannikin eye, said apparatus comprising mating upper and lower curling irons, additional irons to fold and press the lash foundation at a sharp angle relative to the lash strands, means to heat said irons, and means to guide a continuous lash ribbon in proper relation to said irons.

10. Apparatus for forming lashes for a mannikin eye, said apparatus comprising mating upper and lower curling irons, additional irons to fold and press the lash foundation at a sharp angle relative to the lash strands, means to heat the irons, and means operable simultaneously with the irons for severing a length of lash from a continuous ribbon.

11. Apparatus for forming lashes for a mannikin eye, said apparatus comprising mating upper and lower curling irons, additional irons to fold and press the lash foundation at a sharp angle relative to the lash strands, one of said curling irons preceding a folding iron but being yieldably related thereto, means to heat the irons, a press for operating the same, means to guide a continuous lash ribbon in proper relation to the curling and folding irons, means operable by said press simultaneously with the irons for severing a length of lash from a lash ribbon, and adjustable indicator means to determine the length of lash severed from the lash ribbon.

12. Apparatus for forming artificial lashes for an artificial mannikin eye, said lashes being of the conventional type comprising a base or foundation part with lash strands projecting therefrom, said apparatus comprising mating upper and lower irons to clamp and curl the lash strands, a folding iron associated with one of said irons and movable therewith but yieldably related thereto, said folding iron being arranged to press the lash foundation at a sharp angle relative to the lash strands, means to heat at least some of the irons, and a press relatively moving the irons in order to clamp and curl the lash strands and to fold the lash foundation.

SAMUEL MARCUS.